(12) United States Patent
Martinez et al.

(10) Patent No.: US 9,614,688 B2
(45) Date of Patent: Apr. 4, 2017

(54) PROVIDING IMAGE DATA TO A CLIENT DISPLAY DEVICE

(75) Inventors: Martin Martinez, Ladera Ranch, CA (US); Eric Riggert, Lake Forest, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 1203 days.

(21) Appl. No.: 13/297,239

(22) Filed: Nov. 15, 2011

(65) Prior Publication Data
US 2013/0124609 A1   May 16, 2013

(51) Int. Cl.
*G06F 15/16* (2006.01)
*H04L 12/18* (2006.01)

(52) U.S. Cl.
CPC ...... *H04L 12/1854* (2013.01); *H04L 12/1877* (2013.01)

(58) Field of Classification Search
CPC ....... H04L 69/14; H04L 25/14; H04L 65/608; H04L 12/1877; H04L 12/1854
USPC ................................................ 709/223, 203
See application file for complete search history.

(56) References Cited

U.S. PATENT DOCUMENTS

| | | | |
|---|---|---|---|
| 5,854,897 A * | 12/1998 | Radziewicz et al. | 709/224 |
| 6,348,933 B1 * | 2/2002 | Walls et al. | 715/744 |
| 6,539,445 B1 * | 3/2003 | Krum | 710/110 |
| 6,560,630 B1 | 5/2003 | Vepa et al. | |
| 6,704,024 B2 | 3/2004 | Robotham et al. | |
| 7,047,309 B2 | 5/2006 | Baumann et al. | |
| 7,106,760 B1 | 9/2006 | Perumal et al. | |
| 7,215,679 B2 | 5/2007 | Pugel | |
| 7,382,823 B1 | 6/2008 | Cory | |
| 7,406,042 B1 | 7/2008 | Shridher et al. | |
| 7,421,014 B2 | 9/2008 | Kryzak et al. | |
| 7,505,401 B2 | 3/2009 | Kashyap | |
| 7,555,559 B2 | 6/2009 | Chapweske | |
| 7,599,323 B2 | 10/2009 | Chandranmenon et al. | |
| 7,779,030 B2 | 8/2010 | Jin et al. | |
| 7,835,369 B2 | 11/2010 | Hu et al. | |
| 8,788,578 B2 * | 7/2014 | Wood et al. | 709/203 |
| 2009/0080328 A1 | 3/2009 | Hu et al. | |
| 2009/0098943 A1 * | 4/2009 | Weber | G07F 17/32 463/42 |
| 2010/0061235 A1 | 3/2010 | Pai et al. | |

(Continued)

*Primary Examiner* — Glenton B Burgess
*Assistant Examiner* — Tan Doan
(74) *Attorney, Agent, or Firm* — Fitzpatrick Cella Harper & Scinto

(57) ABSTRACT

Providing display information to a client display device communicating with a plurality of servers is disclosed. Each of the servers provides a pre-assigned partial region of an overall image for display on the client display device. The client display device sends a request to each server via a multicast or broadcast communication channel. The request includes an identification of a plurality of partial regions of an image to be displayed on the client display device. The client display device receives image data from each server that is assigned to generate image data for partial regions identified by the client. Each of such servers asynchronously provides the image data for its pre-assigned partial region by sending the image data over one or more respective data communication channels to the client display device, in accordance with the request sent to each server via the communication channel.

20 Claims, 11 Drawing Sheets

(56) References Cited

U.S. PATENT DOCUMENTS

| | | |
|---|---|---|
| 2010/0077058 A1 | 3/2010 | Messer |
| 2010/0179987 A1* | 7/2010 | Sebastian ............ H04L 12/1859 |
| | | 709/203 |
| 2010/0180012 A1* | 7/2010 | Heo .................... H04L 65/1069 |
| | | 709/219 |
| 2010/0235410 A1 | 9/2010 | Apacible et al. |
| 2010/0284275 A1 | 11/2010 | Martinez et al. |
| 2010/0287274 A1* | 11/2010 | Martinez et al. ............. 709/224 |
| 2010/0287296 A1 | 11/2010 | Riggert et al. |
| 2010/0296511 A1 | 11/2010 | Prodan et al. |
| 2010/0296521 A1 | 11/2010 | Martinez et al. |

* cited by examiner

PROVIDING IMAGE DATA TO A CLIENT DISPLAY DEVICE

FIELD

The present disclosure generally relates to providing image data to a client display device, and more specifically relates to providing image data to a client display device communicating with a plurality of servers, where the plurality of servers provide the image data.

BACKGROUND

In client-server computing models, there typically is a one-to-one or one-to-many relation between server and client, where a single server serves a single client or multiple clients. For example, a single server may provide graphical image information for an image to be displayed on a single thin client. In another example, a single server may provide graphical image information for an image to be displayed on multiple clients such as for an online web-based class. However, in these client-server models, the server often becomes overburdened such that the server provides less than adequate delivery of the graphical image information.

SUMMARY

The inventors herein have previously proposed a client-server model with a multiple servers to one client relationship, or a multiple servers to multiple clients relationship. One example is U.S. Patent Application Publication No. 2010/0296521, by Martin Martinez, et al., filed May 22, 2009, the contents of which are incorporated by reference herein. However, the inventors have sometimes encountered challenges in providing complex graphical image information to the client with these arrangements.

In the present disclosure, the foregoing challenges are addressed by providing display information to a client display device communicating with a plurality of servers, each of which provides a pre-assigned partial region of an overall image for display on the client display device. The client display device then reconstructs the partial regions into the overall image.

Thus, in an example embodiment described herein, the client display device sends a request to each of the plurality of servers via a communication channel. The request includes an identification of a plurality of partial regions of an image to be displayed on the client display device. The client display device receives image data from each of the plurality of servers that are assigned to generate image data for partial regions identified by the client display device. Each of such plurality of servers asynchronously provides the image data for its pre-assigned partial region by sending the image data over one or more respective data communication channels to the client display device. The image data is provided by each of the plurality of servers in accordance with the request sent to each of the plurality of servers via the communication channel. The client display device reconstructs the image data into the overall image to be displayed on the client display device, and displays the overall image on a display.

In an example embodiment also described herein, the client display device includes a transmission unit constructed to transmit a multicast communication to the plurality of servers. The client display device further includes a network communication framework constructed to manage an apportionment of image data sent from a respective one of the plurality of servers over a respective plurality of data communication channels. The one of the plurality of servers is assigned to generate image data for its pre-assigned partial region. The network communication manages the apportionment of image data based on communications within the network communication framework and communications received from the one of the plurality of servers. The client display device also includes a display for displaying the overall image. Each of the plurality of servers apportions and sends the image data over a respective plurality of data communication channels to the client display device in accordance with the multicast communication transmitted by the transmission unit. The network communication framework reconstructs the apportioned image data into the respective pre-assigned partial regions, and reconstructs the pre-assigned partial regions into the overall image.

In another example embodiment described herein, each of the plurality of servers apportions and sends data over one or more data communication channels to the client display device. Before sending data, each of the plurality of servers determines whether the data to be sent is image data associated with the pre-assigned partial region assigned to the server. If it is determined that the data to be sent is image data, the server first sends information indicating an intended establishment of one or more new data communication channels over which to send the image data to the client display device. The server receives an acknowledgment sent from the client display device via a multicast communication channel. The acknowledgment confirms the intended establishment of the one or more new data communication channels. The server then establishes the one or more new data communication channels, and apportions and sends the image data over the established one or more new data communication channels to the client display device.

In yet another example embodiment described herein, each of the plurality of servers receives information from the client display device. The information indicates which portion of the overall image is to be updated. Each of the plurality of servers determines based on the information whether the entire overall image is to be updated. If it is determined that the entire overall image is to be updated, each server provides image data for the server's pre-assigned partial region by sending the image data over one or more respective data communication channels to the client display device. If it is determined that the entire overall image is not to be updated, each server identifies pre-assigned partial regions adjacent to the server's pre-assigned partial region. The identified adjacent pre-assigned partial regions share a portion of the overall image to be updated with the server's pre-assigned partial region. The server adjusts its pre-assigned partial region so that the portion of the overall image to be updated is not shared with the identified adjacent pre-assigned partial regions. The server provides image data for its adjusted partial region by sending the image data over one or more respective data communication channels to the client display device.

By virtue of the foregoing arrangements, it is ordinarily possible to reduce the time it takes to provide image data to a client display device because both the resources at the server side and the resources at the client side are used more efficiently than compared to a single server to single client relationship. In addition, because multiple servers are used to provide the image data to the client display device, a more robust and reliable connection is provided between the servers and the client device than compared to a single server to single client relationship. Moreover, because multiple servers are used, scalability and clustering within a local area network environment can be easily accomplished.

This brief summary has been provided so that the nature of the disclosure may be understood quickly. A more complete understanding can be obtained by reference to the following detailed description and to the attached drawings.

DETAILED DESCRIPTION

Figure 1:
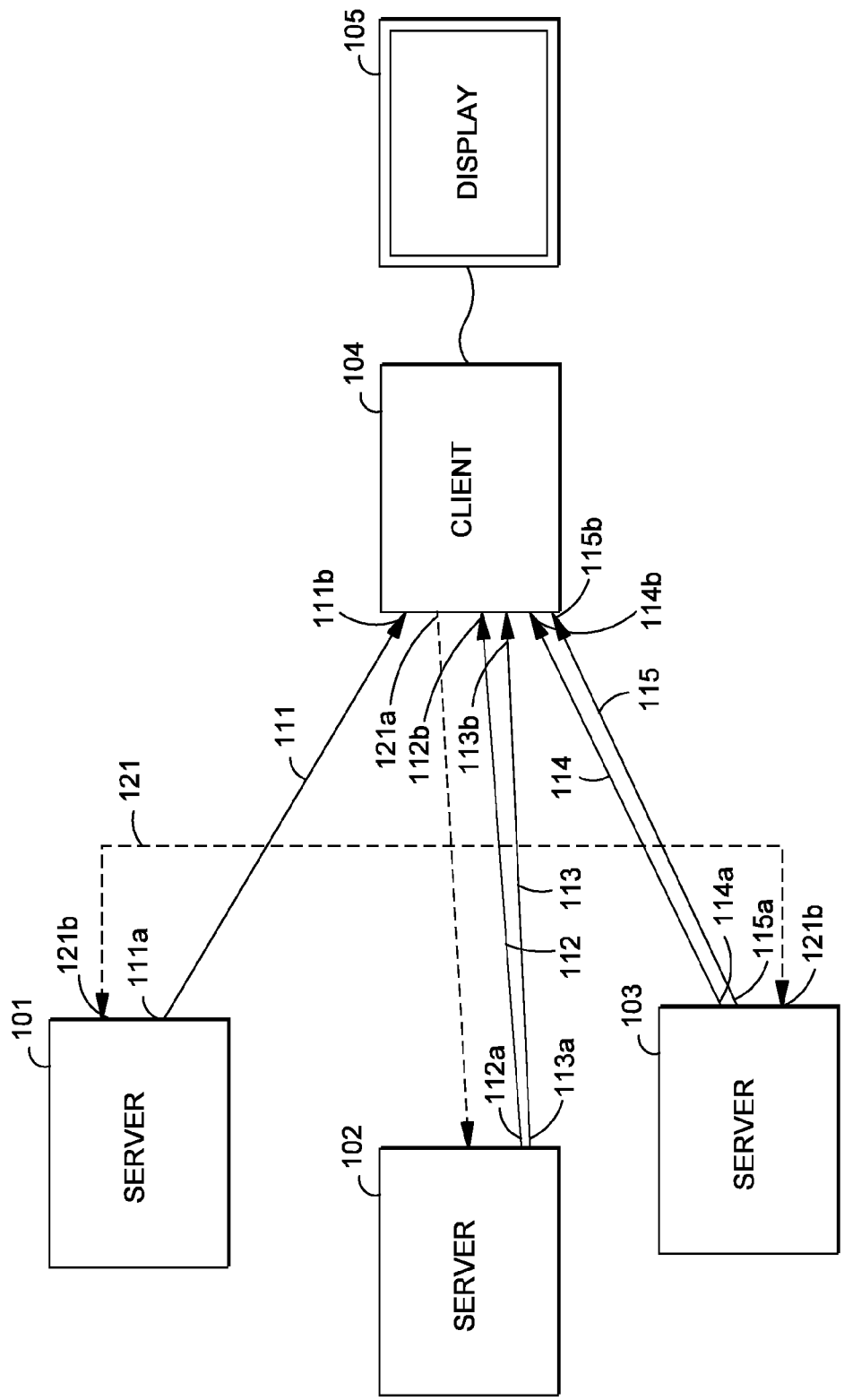
FIG. 1 is a representative view of a plurality of servers communicating with a client, according to an example embodiment.

FIG. 1 is a representative view of a plurality of servers 101 to 103 each communicating with a client 104 according to an example embodiment. As shown in FIG. 1, server 101 communicates with the client 104 via data communication channel 111, server 102 communicates with the client 104 via data communication channels 112 and 113, and server 103 communicates with the client 104 via data communication channels 114 and 115. Servers 101 to 103 are shown in FIG. 1; however, in other example embodiments, there may be more or less servers communicating with the client 104. In addition, client display device 104 is shown in FIG. 1; however, in other example embodiments, there may be more than one client communicating with the servers.

In one example embodiment, the data communication channels 111 to 115 are physical interfaces connecting the respective server to the client 104. The physical interfaces may include, for example, multiple ones of a wired Ethernet, a wireless connection, Multimedia over Coax Alliance (MoCA), and powerline Ethernet. In another embodiment, the data communication channels 111 to 115 are communication channels carried over a single physical interface. In this example embodiment that data communication channels are, for example, TCP/IP communication channels.

Data communication channel 111 includes data communication channel interface 111*a* at the server side and data communication channel interface 111*b* at the client side. Data communication channels 112 and 113 include data communication channel interfaces 112*a* and 113*a* at the server side and data communication channel interfaces 112*b* and 113*b* at the client side. Data communication channels 114 and 115 include data communication channel interfaces 114*a* and 115*a* and data communication channel interfaces 114*b* and 115*b* at the client side. Each of data communication channel interfaces 111*a* to 115*a* sends segmented data, and each of the data communication channel interfaces 111*b* to 115*b* accepts segmented data.

As further shown in FIG. 1, client 104 may communicate with each of servers 101 to 103 via a multicast communication channel 121. The multicast communication channel 121 includes multicast communication channel interfaces 121*b* at the server side and multicast communication channel interface 121*a* at the client side. One multicast communication channel is shown in FIG. 1; however, client 104 can communicate with servers 101 to 103 via two or more multicast communication channels. In other embodiments, client 104 may communicate with each of the servers 101 to 103 via a broadcast communication channel. In addition, client 104 can communicate with servers 101 to 103 individually via data communication channels 111 to 115 by using network addresses. In addition, the servers 101 to 103 can also communicate with each other and the client using a multicast communication channel, a broadcast communication channel, or other communication channel shared by the servers 101 to 103 and the client.

Client 104 includes display 105. Display 105 can be a touchscreen that can detect the presence and location of a touch, for example, by a finger or hand of a user, within the display 105. In this example embodiment, the display 105 enables the user to interact directly with what is displayed, rather than indirectly with a pointer controlled by a mouse or touchpad. In other example embodiments, the user can interact with the display using a mouse or a touchpad (not shown).

Client 104 with display 105 can be included, for example, on a network printer being shared by multiple computers. However, in other example embodiments, client 104 with display 105 can be included in other devices having an interactive display.

Servers 101 to 103 also include computer-readable memory media, such as fixed disk 220 (shown in FIG. 2), which is constructed to store computer-readable information, such as computer-executable process steps or a computer-executable program for causing the servers to provide image data to be displayed on the display 105 of the client 104, as described below. In some embodiments, information can be retrieved by the servers through other computer-readable media such as through a network interface (not shown).

Client 104 also includes computer-readable memory media, such as fixed disk 320 (shown in FIG. 3), which is constructed to store computer-readable information, such as computer-executable process steps or a computer-executable program for causing the client 104 to receive, reconstruct and display image data, as described below.

The architecture as shown in FIG. 1 can be adapted, for example, by using a tunneling mechanism, or expanded to function within a cloud computing environment or a grid environment.

Figure 2:
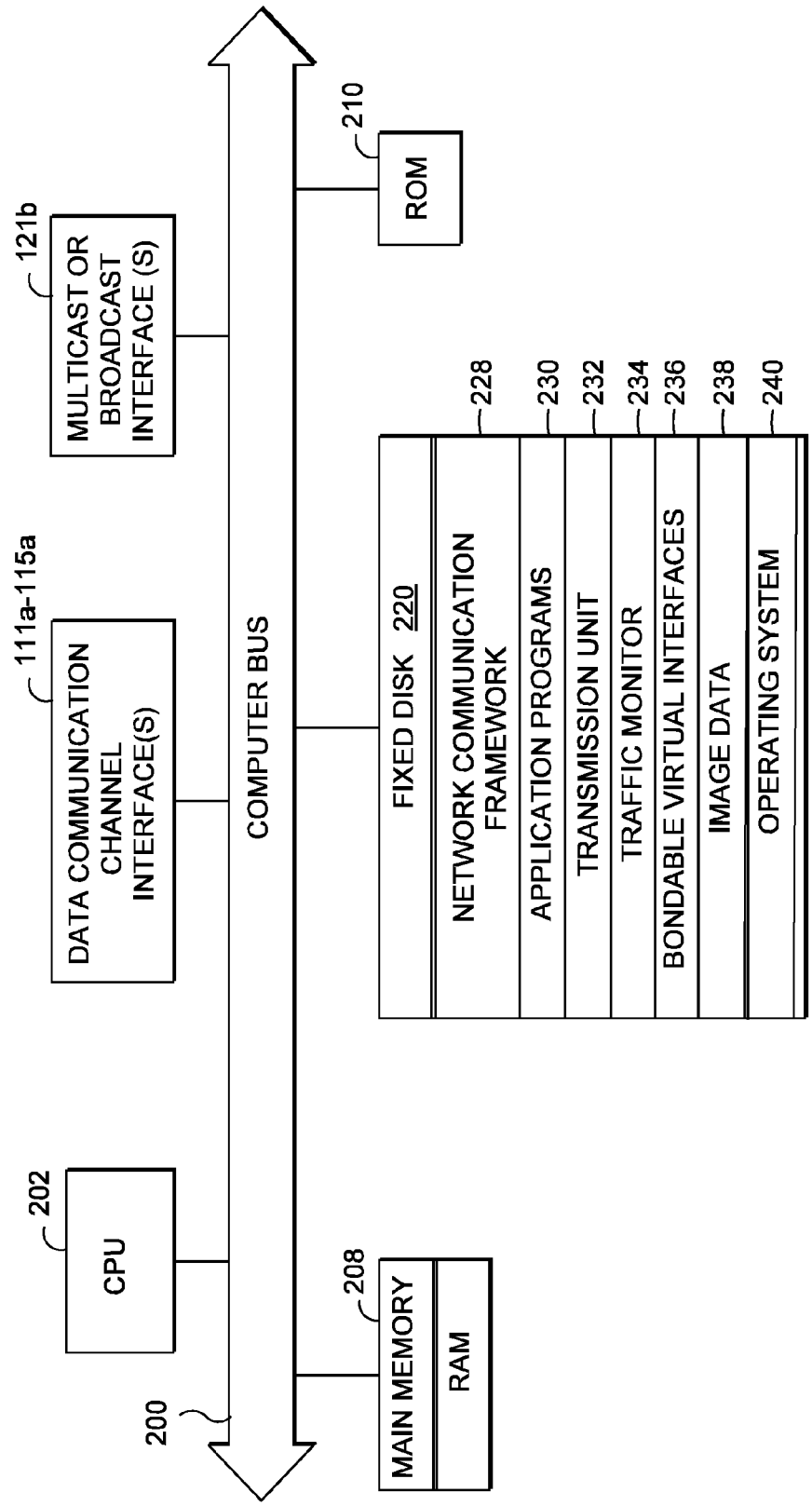
FIG. 2 is a detailed block diagram for explaining the internal architecture of each of the servers of FIG. 1.

FIG. 2 is a detailed block diagram for explaining the internal architecture of each of the servers 101, 102 and 103 of FIG. 1. As shown in FIG. 2, each of the servers 101, 102 and 103 includes central processing unit (CPU) 202 which interfaces with computer bus 200. Also interfacing with computer bus 200 are fixed disk 220 (e.g., a hard disk or other nonvolatile computer-readable storage medium), data communication channel interface(s) 111*a* to 115*a*, multicast or broadcast interface(s) 121*b*, random access memory (RAM) 208 for use as a main run-time transient memory and read only memory (ROM) 210.

RAM 208 interfaces with computer bus 200 so as to provide information stored in RAM 208 to CPU 202 during execution of the instructions in software programs such as application programs and interface drivers. More specifically, CPU 202 first loads computer-executable process steps from fixed disk 220, or another storage device into a region of RAM 208. CPU 202 can then execute the stored process steps from RAM 208 in order to execute the loaded computer-executable process steps. In addition, data such as image data 238 or other information can be stored in RAM 208, so that the data can be accessed by CPU 202 during the execution of computer-executable software programs, to the extent that such software programs have a need to access and/or modify the data.

As also shown in FIG. 2, hard disk 220 contains network communication framework 228, application programs 230 and operating system 240 for starting up and shutting down the servers 101 to 103 or other programs. Hard disk 220 further contains transmission unit 232 for transmitting data, for example, image data, to the client 104. Hard disk 220 also contains traffic monitor 234 for gathering performance statistics for each of the data communication channels (e.g., 111a to 115a of FIG. 1). In addition, hard disk 220 contains bondable virtual interfaces 236 for splitting and combining sent and received data, respectively. Further, hard disk 220 contains image data 338 that each server may send to the client 104.

In an example embodiment, network communication framework 228 and traffic monitor 234 are loaded by CPU 202 into a region of RAM 208. CPU 202 then executes the stored network communication framework 228 and traffic monitor 234 from RAM 208 in order to execute the loaded computer-executable steps. In addition, application programs 230 are loaded by CPU 202 into a region of RAM 208. CPU 202 then executes the stored process steps as described in detail below in connection with FIGS. 6A, 6B, 7 and 9, in order to execute the loaded computer-executable steps.

Figure 3:
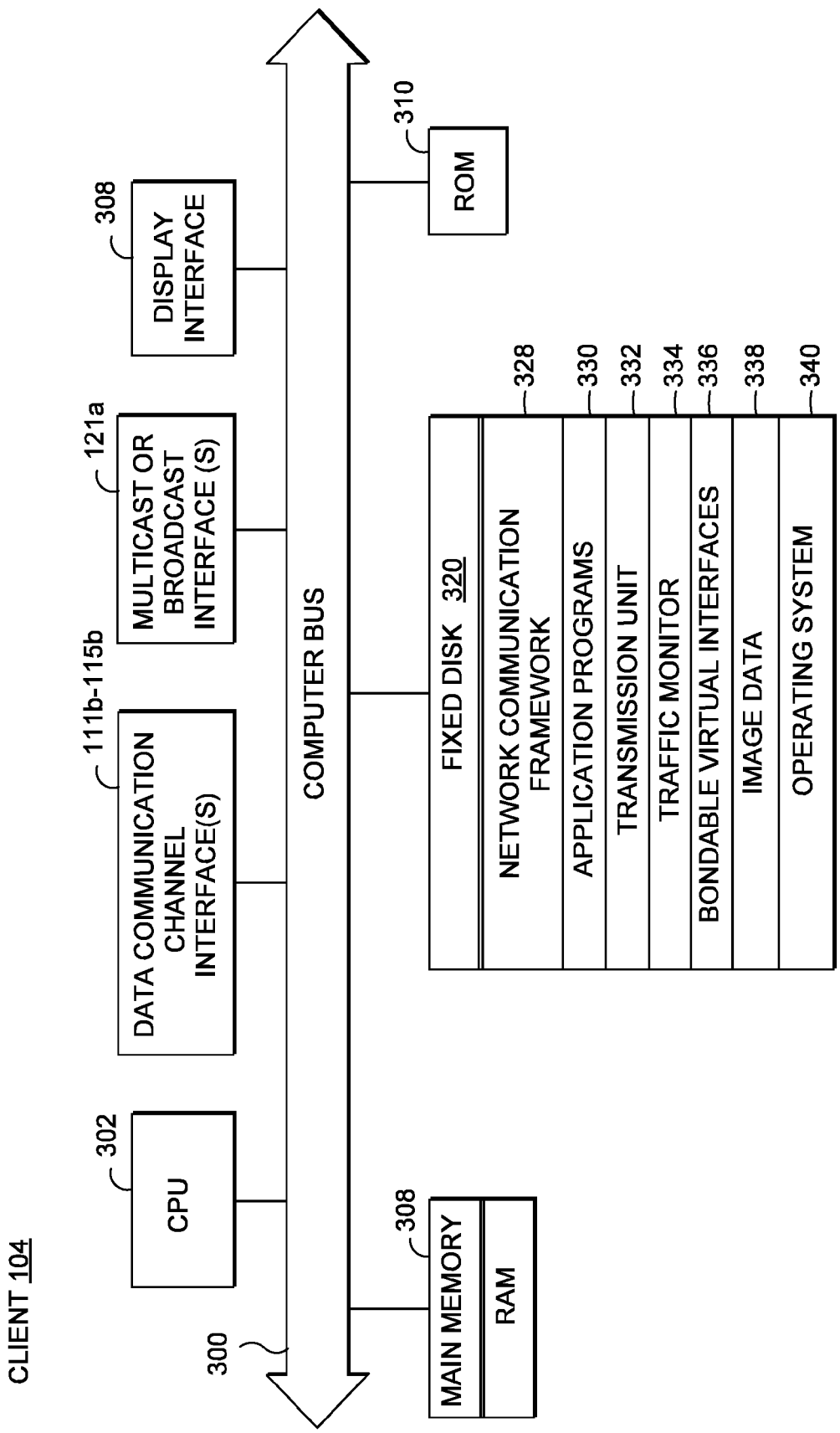
FIG. 3 is a detailed block diagram for explaining the internal architecture of the client of FIG. 1.

FIG. 3 is a detailed block diagram for explaining the internal architecture of the client 104 of FIG. 1. As shown in FIG. 3, the client 104 includes central processing unit (CPU) 302 which interfaces with computer bus 300. Also interfacing with computer bus 300 are fixed disk 320 (e.g., a hard disk or other nonvolatile computer-readable storage medium), data communication channel interface(s) 111b to 115b, multicast or broadcast interface(s) 121a, display interface 312, random access memory (RAM) 308 for use as a main run-time transient memory and read only memory (ROM) 310.

RAM 308 interfaces with computer bus 300 so as to provide information stored in RAM 308 to CPU 302 during execution of the instructions in software programs such as application programs, and interface drivers. More specifically, CPU 302 first loads computer-executable process steps from fixed disk 320, or another storage device into a region of RAM 308. CPU 302 can then execute the stored process steps from RAM 308 in order to execute the loaded computer-executable process steps. In addition, data such as image data or other information can be stored in RAM 308, so that the data can be accessed by CPU 302 during the execution of computer-executable software programs, to the extent that such software programs have a need to access and/or modify the data.

As also shown in FIG. 3, hard disk 320 contains network communication framework 328, application programs 330 and operating system 340 for starting up and shutting down the client 104 or other programs. Hard disk 320 further contains transmission unit 332 for transmitting data, via, for example, multicast or broadcast, to each of the servers 101 to 103. Hard disk 320 also contains traffic monitor 334 for gathering performance statistics for each of the data communication channels (e.g., 111b to 115b of FIG. 1). In addition, hard disk 320 contains bondable virtual interfaces 336 for splitting and combining sent and received data, respectively. Further, hard disk 320 contains image data 338 that corresponds to an image to be displayed on the display 105.

In an example embodiment, network communication framework 328 and traffic monitor 334 are loaded by CPU 302 into a region of RAM 308. CPU 302 then executes the stored process steps of the network communication framework 328 and the traffic monitor 334 from RAM 308 in order to execute the loaded computer-executable steps. In addition, the process steps of the application programs 330 are loaded by CPU 302 into a region of RAM 308. CPU 302 then executes the stored process steps as described in detail below in connection with FIGS. 5 and 8, in order to execute the loaded computer-executable steps.

The transmission unit 332 is constructed to transmit a multicast communication to the plurality of servers, which is described in more detail below in connection with FIGS. 5 and 8.

The network communication framework 328 is constructed to manage an apportionment of image data sent from a respective one of the servers 101 to 103 over respective data communication channels, based on communications within the network communication framework 328 and communications received from the respective server. Each respective server is assigned to generate image data for its pre-assigned partial region. The foregoing is described in more detail below in connection with FIGS. 5 to 9.

The network communication framework 328 communicates with the network communication framework 228 comprised in each of the servers 101 to 103 via the multicast communication channel 121.

The traffic monitor 334 gathers information including at least performance characteristics of each of the data communication channels. The network communication framework 328 communicates with the network communication framework 228 comprised in each of the servers based on the information gathered by the traffic monitor 328.

In some example embodiments, bondable virtual interfaces (e.g., bondable virtual interfaces 236 and 336) can be used in the internal architecture of the client and the servers. For a detailed description of bondable virtual interfaces and their function, see U.S. Patent Application Publication No. 2010/0287274, by Martin Martinez, et al., filed May 8, 2009, and U.S. Patent Application Publication No. 2010/0284275, by Martin Martinez, et al., filed May 8, 2009, the contents of each of which are incorporated herein by reference.

Further to the above-mentioned U.S. publications, according to one example embodiment, a single, monolithic, bondable virtual interface can be included in the client to handle the plurality of data communications channels from each server.

In other example embodiments, a container bondable virtual interface can be included in the client, which includes within it separate bondable virtual interfaces, each of which can handle the data communications channels for a particular server.

In some example embodiments, separate bondable virtual interfaces can be included in the client, one for each server or each region of an overall image, where the separate bondable virtual interfaces communicate with each other through the multicast communication channel. In other example embodiments, the separate bondable virtual interfaces can communicate indirectly using the traffic monitor.

Figure 4:
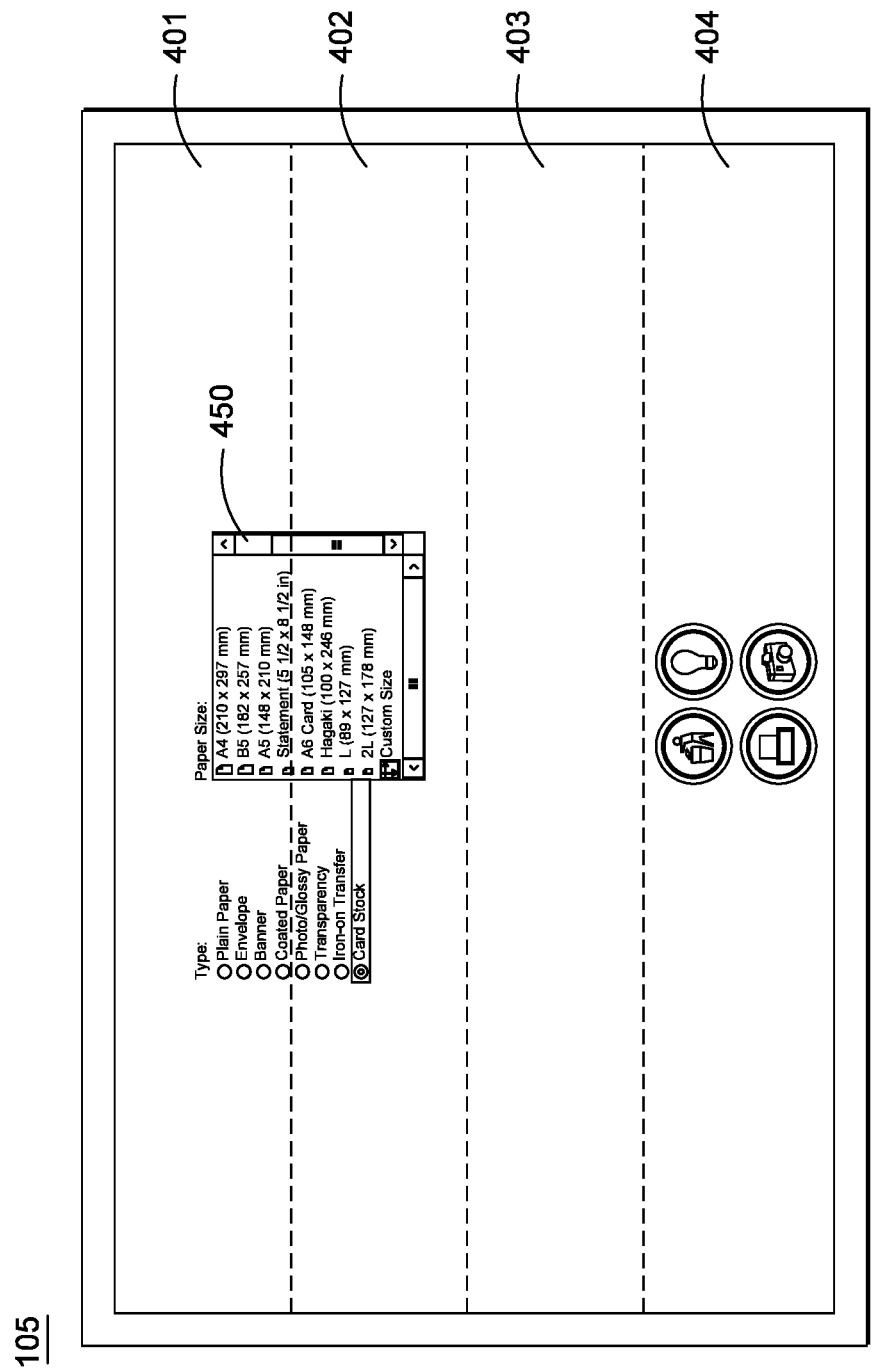
FIG. 4 is a detailed view of a display of the client shown in FIG. 1.

FIG. 4 is a detailed diagram of the display 105 of the client display device 104 shown in FIG. 1. As shown in FIG. 4, an overall image displayed on the display 105 is split into regions (the splitting of the overall image not being visible to a user), for example, partial regions 401 to 404. Generally, each server is responsible for providing image data for one or more of the defined regions, for example, regions 401 to 404. A user can interact with the display 105 which may result in one or more of the regions needing updated image data. For example, if the user pushes a button whose image data is included in region 403, the server responsible for providing image data for region 403 provides updated image data for the pressed button based on a request sent by the client. In addition, if pressing the button has an effect of opening a new menu window, for example, in regions 401 and 402, then the server or servers responsible for providing image data for those regions provides the updated image data for the new menu window based on the same request sent by the client. A detailed explanation is provided below in connection with FIGS. 5 to 9 which describe in detail how the servers and client communicate to provide the image data to the client to be displayed as an overall image on the display 105.

Figure 5:
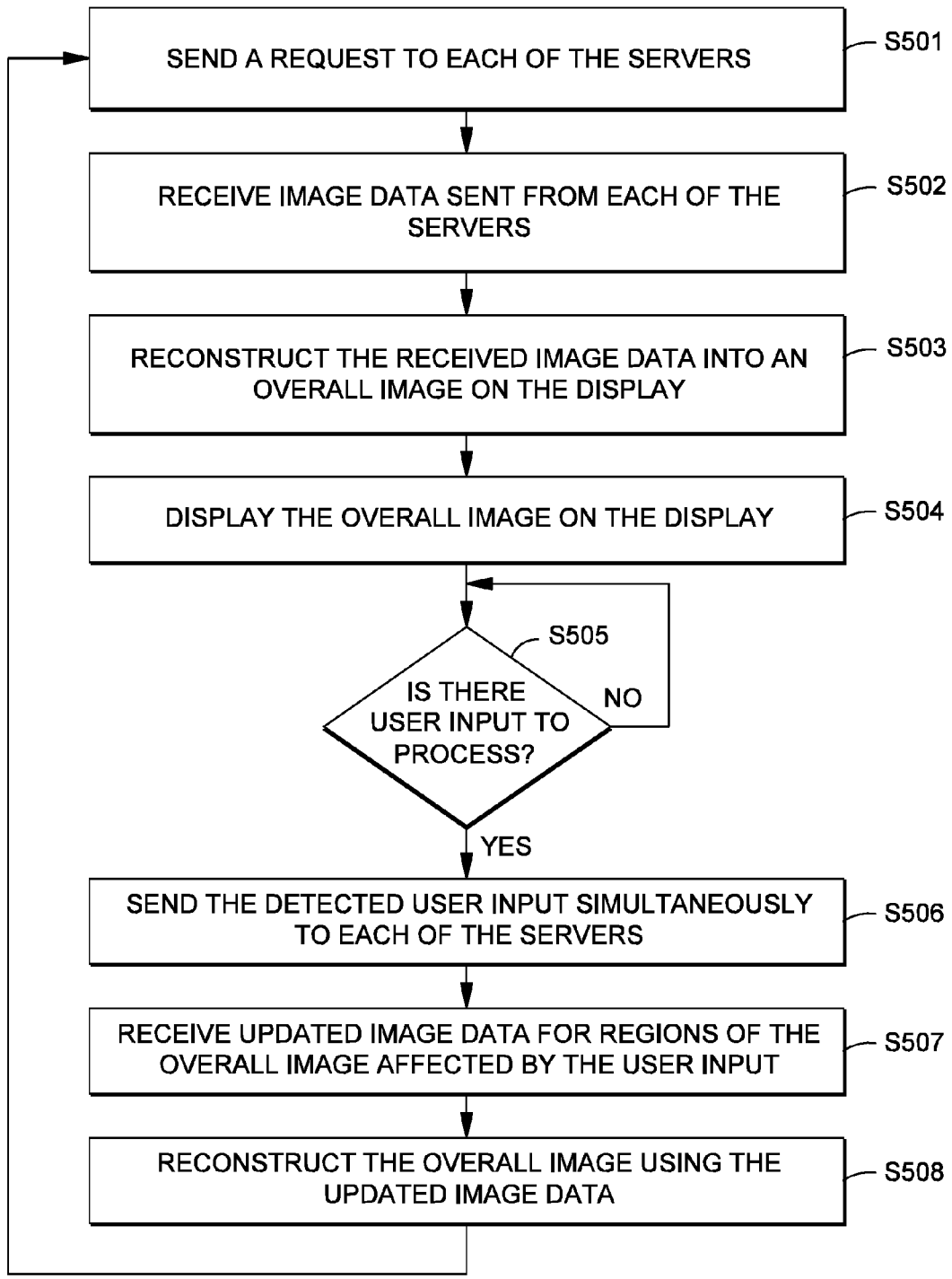
FIG. 5 is a flow chart for providing a detailed explanation of an example embodiment.

FIG. 5 is a flowchart for providing a detailed explanation of an example embodiment from the perspective of the client display device 104. The process steps shown in FIG. 5 are computer-executable process steps stored on a computer-readable memory medium such as at 330 on disk 320. The computer-executable process steps are executed by CPU 302, so as to implement providing image data to the client display device 104 which communicates with the plurality of servers 101 to 103, each of which provides a pre-assigned partial region of an overall image for display on the client display device 104.

According to the process steps shown in FIG. 5, the client display device 104, in step S501, sends a request to each of the servers (e.g., servers 101 to 103 of FIG. 1) via a multicast or a broadcast communication channel (e.g., multicast communication channel 121 of FIG. 1). The request includes an identification of a plurality of partial regions of an image to be displayed on the client display device 104. For simplicity, it is assumed in this example embodiment that each of the servers can provide the same service, and that the request sent by the client display device 104 is associated with that same service. However, in other example embodiments, the servers can provide different services, and the request can be associated with one or more of the different services.

In step S502, the client display device 104 receives image data from each of the servers that are assigned to generate image data for partial regions identified by the client display device 104. Each of these servers asynchronously provides the image data for its pre-assigned partial region by sending the image data over one or more respective data communication channels (e.g., data communication channels 111 or 112, 113 or 114, 115) to the client display device 104 as discussed in connection with FIG. 6B. The pre-assigned partial region for each server can be decided by the servers and accepted by the client display device. Alternatively, the pre-assigned partial region for each server can be decided by the client display device and accepted by the servers. Each of these servers provides the image data in accordance with the request sent by the client display device 104 via, for example, the multicast or the broadcast communication channel 121 as discussed in connection with FIGS. 6A and 6B.

In step S503, the client display device 104 reconstructs the image data into the overall image to be displayed. In step S504, the client display device 104 displays the overall image on the display 105 of the client display device 104.

In step S505, the client display device 104 determines whether or not there is a user input on the display 105 of the client display device 104. If the client display device 104 determines that there is a user input, the process continues to step S506. If the client display device 104 determines that there is not a user input, the processes returns to step S505. In step S506, the client display device 104 sends the detected user input simultaneously to each of the plurality of servers via a multicast communication channel. This multicast communication channel can be multicast communication channel 121, or can be another multicast communication channel or broadcast communication channel created by the client display device 104 to handle user inputs and to control each of the servers. Each server whose pre-assigned partial region is affected by the user input, generates and sends updated image data for its pre-assigned partial region over the respective data communication channels based on the user input as discussed in FIGS. 6A and 6B.

In step S507, the client display device 104 receives the updated image data for the regions affected by the user input. In step S508, the client display device 104 reconstructs the overall image using the updated image data. After step S508, the process returns to step S501. In this regard, the process can return to step S501 immediately after the client display device reconstructs the overall image. In the alternative, the process can return to step S501 after a set period of time.

In some embodiments, an additional service is provided by one of the servers, and a specific region of the overall image to be displayed on the display of the client display device is defined for the additional service. The server generates and sends image data for the specific region, in accordance with the additional service, to the client display device. The additional service can be, for example, an advertisement service.

Figure 6A:
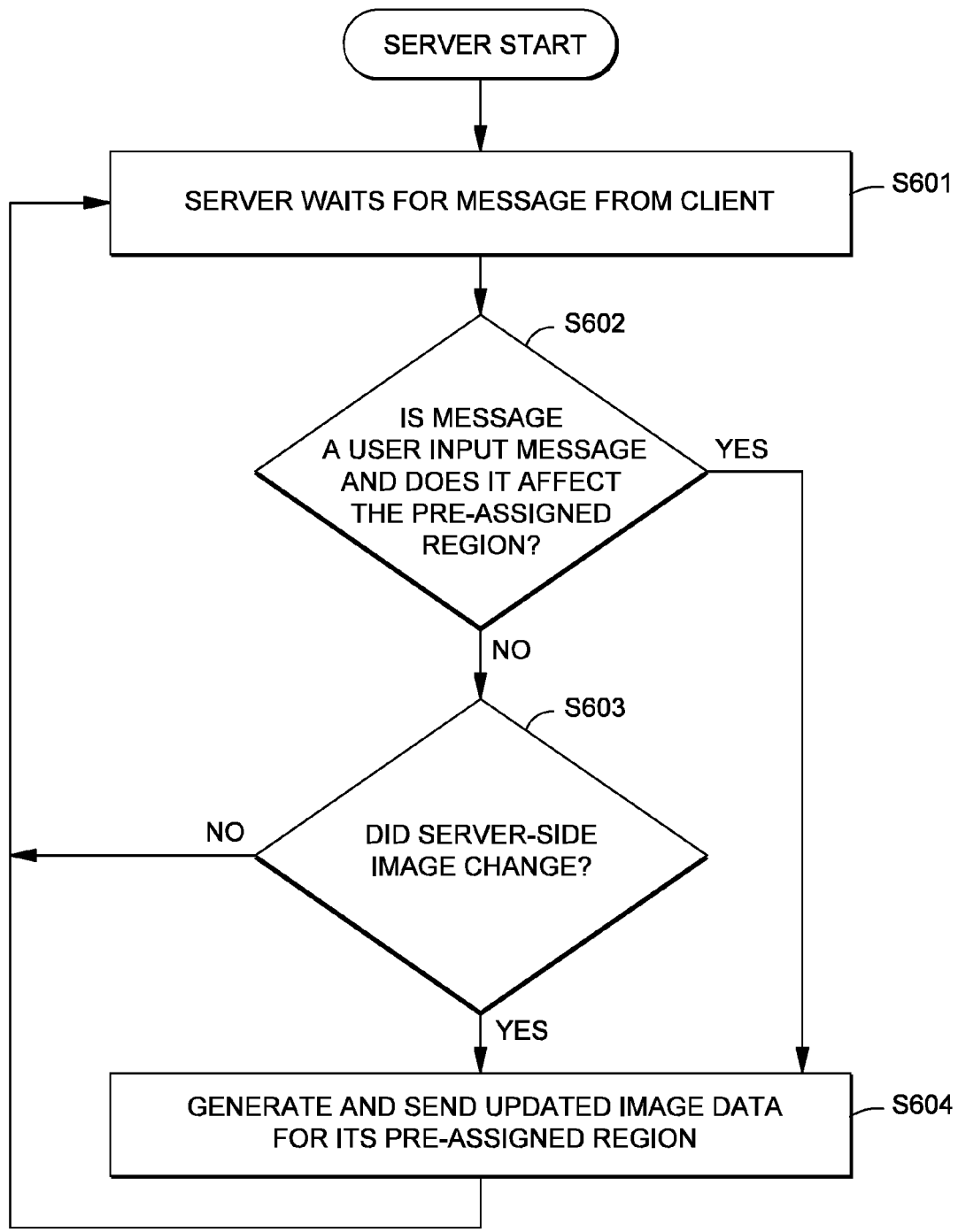
FIG. 6A is a flow chart for providing a detailed explanation of an additional example embodiment.

FIG. 6A is a flow chart for providing a detailed explanation of another example embodiment from the perspective of the servers (e.g., servers 101 to 103 of FIG. 1). The process steps shown in FIG. 6A are computer-executable process steps stored on a computer-readable memory medium such as at 230 on disk 220. The computer-executable process steps are executed by CPU 202, so as to implement providing image data to the client display device 104 which communicates with the plurality of servers 101 to 103, each of which provides a pre-assigned partial region of an overall image for display on the client display device 104.

According to the process steps shown in FIG. 6A, in step S601, each of the servers 101 to 103 waits for a message sent from the client display device 104. The message can indicate, for example, that a user input has been detected on the display such as described above in connection with step S506 of FIG. 5. In other examples, the message can provide any other type of information such as an acknowledgment that data was received successfully. Upon receiving the message from the client display device 104, each server determines whether the message indicates that a user input has been detected at the client display device 104, and determines whether the detected user input affects the server's pre-assigned partial region (step S602).

If it is determined in step S602 that the message indicates that a user input has been detected, and that the detected user input affects the server's pre-assigned partial region, then the process continues to step S604. If it is determined in step S602 that the message indicates that a user input has been detected but the detected user input does not affect the server's pre-assigned partial region, or if it is determined that the message does not indicate that a user input has been detected, the process continues to step S603.

In step S603, each server determines whether the image on the server-side has changed. The image on the server-side may change, for example, when any type of notification information is to be provided to a user of the client display device without a request from the user. In another example, the image on the server-side may change if the particular server is providing an advertisement service for its pre-assigned partial region and the advertisement is to be updated.

If it is determined in step S603 that the image on the server-side has changed, the process continues to step S604. If it is determined in step S603 that the image on the server-side has not changed, the process returns to step S601.

In step S604, the server generates and sends updated image data for its pre-assigned partial region of the overall image to the client display device 104. After sending the updated image data, the process returns to step S601, in which each server waits to receive a message from the client display device 104.

Figure 6B:
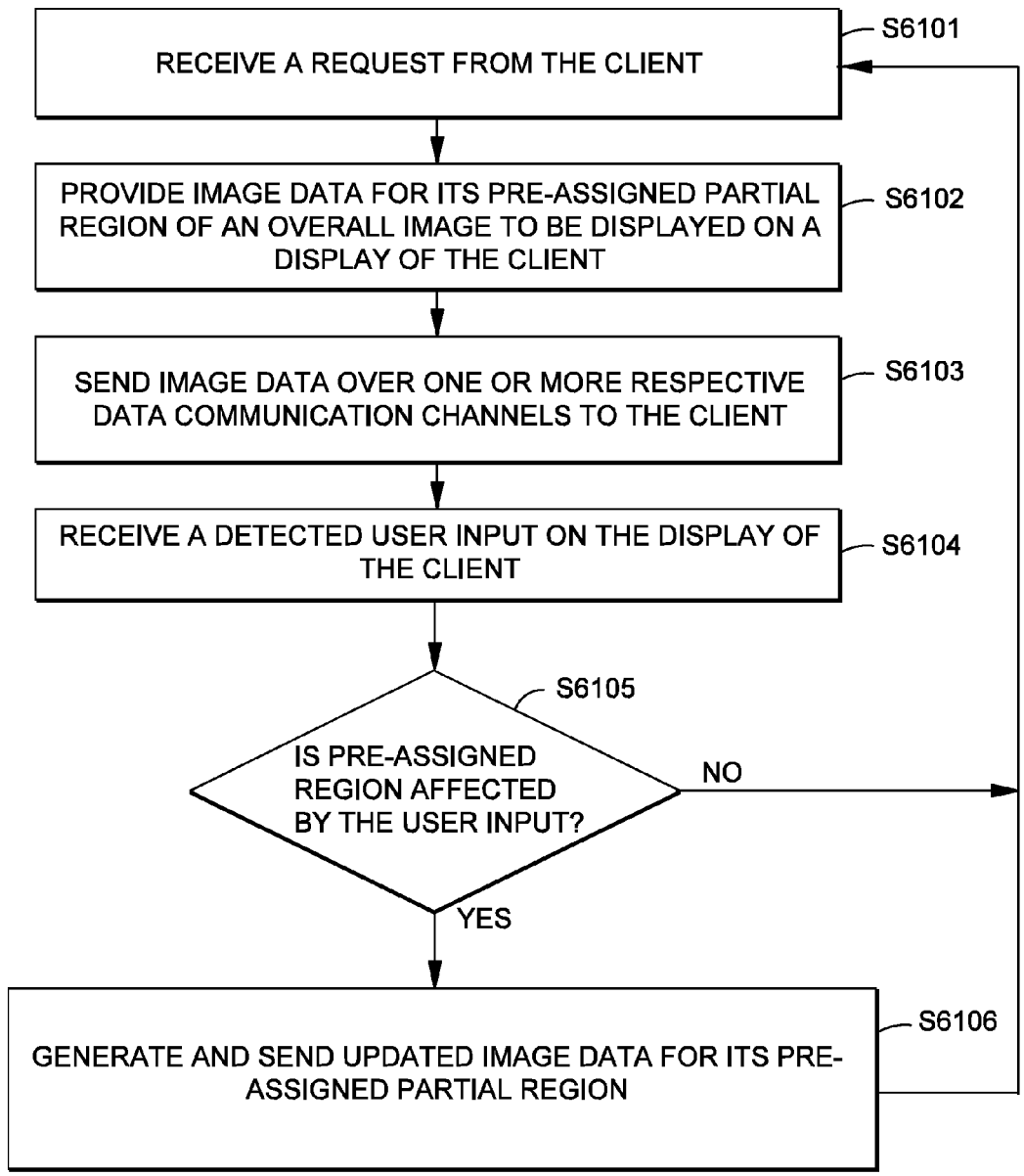
FIG. 6B is a flow chart for providing a detailed explanation of another example embodiment.

FIG. 6B is a flow chart for providing a detailed explanation of an additional example embodiment from the perspective of the servers (e.g., servers 101 to 103 of FIG. 1). The process steps shown in FIG. 6B are computer-executable process steps stored on a computer-readable memory medium such as at 230 on disk 220. The computer-executable process steps are executed by CPU 202, so as to implement providing image data to the client display device 104 which communicates with the plurality of servers 101 to 103, each of which provides a pre-assigned partial region of an overall image for display on the client display device 104.

According to the process steps shown in FIG. 6B, in step S6101, each of the servers 101 to 103 receives a request sent from the client display device 104, for example, as in step S501 of FIG. 5. As discussed above in connection with FIG. 5, the request includes an identification of a plurality of partial regions of an image to be displayed on the client display device 104. In step S6102, based on the request, each server provides image data for its pre-assigned partial region of an overall image to be displayed on the display 105 of the client display device 104. In this regard, in step S6103, each server sends the image data over one or more respective data communication channels (e.g., data communication channels 111 or 112, 113 or 114, 115) to the client display device 104.

In step S6104, each server receives a user input that was detected by the client display device 104 such as in step S505 of FIG. 5 and sent by the client display device 104 simultaneously to each of the servers such as in step S506 of FIG. 5. Each server then determines in step S6105 whether its pre-assigned region is affected by the user input. If a server's pre-assigned region is affected by the user input, then the server generates and sends updated image data for its pre-assigned partial region of the overall image to the client display device 104 (step S6106). If the server's pre-assigned region is not affected by the user input, the process returns to step S6101.

By virtue of the foregoing arrangements, it is ordinarily possible to reduce the time it takes to provide image data to a client display device because both the resources at the server side and the resources at the client side are used more efficiently than compared to a single server to single client relationship. In addition, because multiple servers are used to provide the image data to the client display device, a more robust and reliable connection is provided between the servers and the client device than compared to a single server to single client relationship. Moreover, because multiple servers are used, scalability and clustering within a local area network environment can be easily accomplished.

Redirecting Image Data

Figure 7:
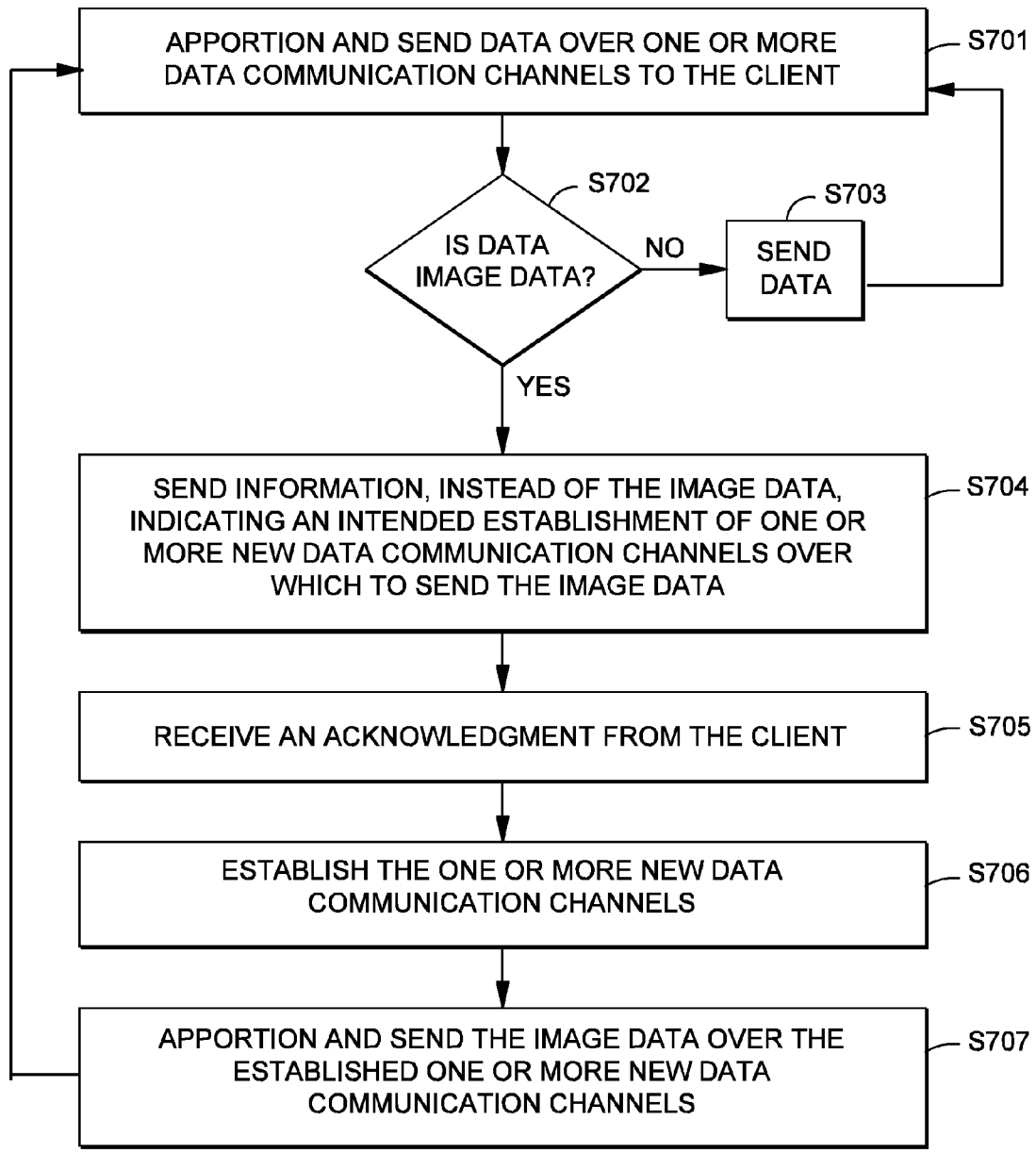
FIG. 7 is a flow chart for providing a detailed explanation of yet another example embodiment.

FIG. 7 is a flow chart for providing a detailed explanation of yet another example embodiment from the perspective of the servers (e.g., servers 101 to 103 of FIG. 1). The process steps shown in FIG. 7 are computer-executable process steps stored on a computer-readable memory medium such as at 230 on disk 220. The computer-executable process steps are executed by CPU 202, so as to implement providing image data to the client display device 104 which communicates with the plurality of servers 101 to 103, each of which provides a pre-assigned partial region of an overall image for display on the client display device 104.

According to the process steps shown in FIG. 7, in step S701, each server apportions and sends data over one or more data communication channels to the client display device 104. In step S702, each server determines whether the data to be sent is image data associated with the pre-assigned partial region assigned to the server. If it is determined that the data to be sent is not image data, then the data is sent to the client display device 104 in step S703. On the other hand, if it is determined that the data to be sent is image data, each server sends information, instead of the image data, indicating an intended establishment of one or more new data communication channels over which to send the image data to the client display device 104 (step S704). In step S705, each server receives an acknowledgment sent from the client display device 104 via a multicast communication channel (e.g., multicast communication channel 121 of FIG. 1). The acknowledgment confirms the intended establishment of the one or more new data communication channels. In step S706, the one or more new data communication channels are established. In step S707, each server apportions and sends the image data over the established one or more new data communication channels to the client display device 104.

In some embodiments, the one or more new data communication channels are included in an existing bondable virtual interface comprised in the client display device and/or the server. In other embodiments, the one or more new data communication channels are included in a new bondable virtual interface created in the client display device and/or the server.

If in step S702, it is determined that data is subsequent image data, the server sends information, rather than the subsequent image data, referencing the established one or more new data communication channels over which to send the subsequent image data to the client display device 104. Then, in step S707, the server sends the subsequent image data over the one or more new data communication channels to the client display device 104.

The multicast communication channel (e.g., 121 of FIG. 1) can be used to synchronize the sent data and image data.

In step S702, a further determination can be made as to whether the data to be sent is of high priority. If it is determined that the data is of high priority, the server sends the data having high priority over the established one or more new data communication channels to the client display device.

Figure 8:
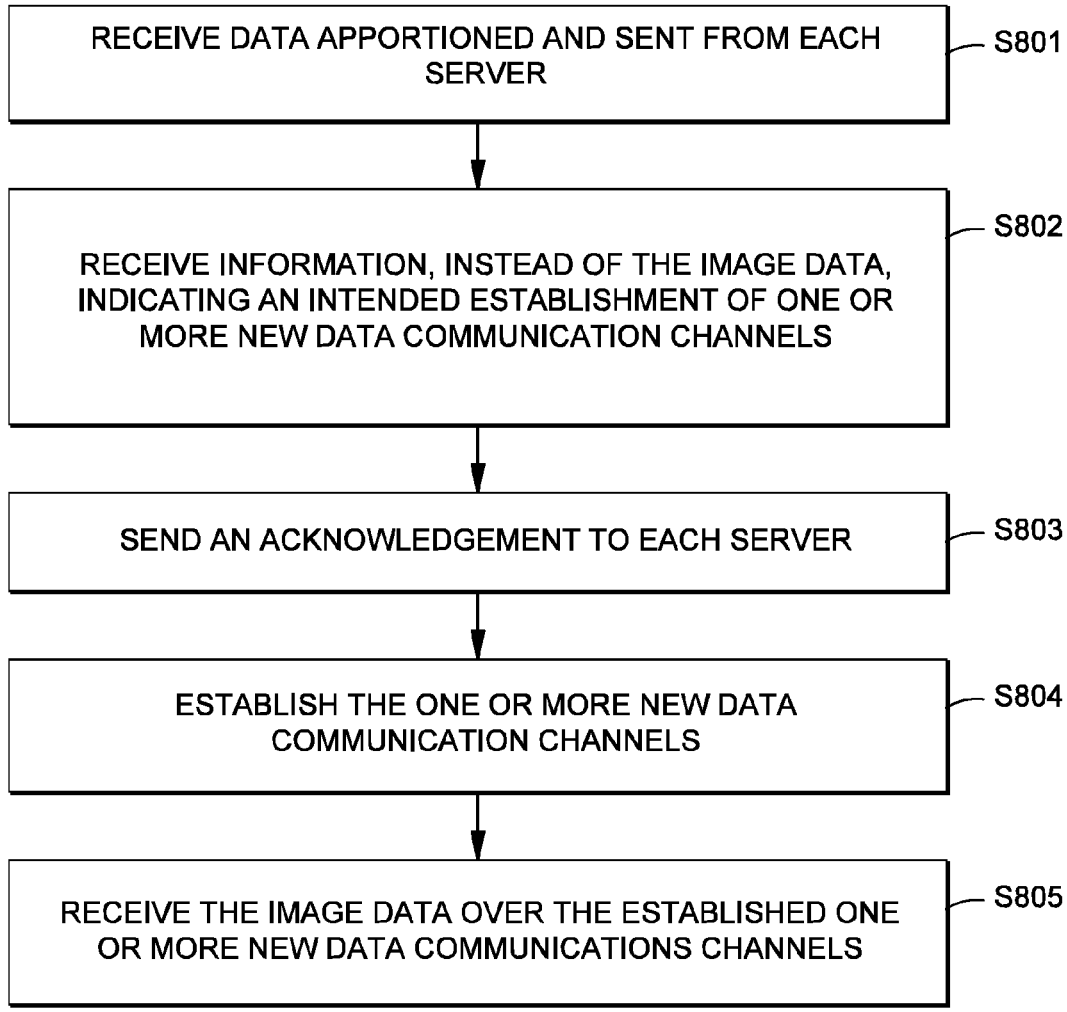
FIG. 8 is a flow chart for providing a detailed explanation of an additional example embodiment.

FIG. 8 is a flow chart for providing a detailed explanation of yet another example embodiment from the perspective of the client display device 104. The process steps shown in FIG. 8 are computer-executable process steps stored on a computer-readable memory medium such as at 330 on disk 320. The computer-executable process steps are executed by CPU 302, so as to implement providing image data to the client display device 104 which communicates with the plurality of servers 101 to 103, each of which provides a pre-assigned partial region of an overall image for display on the client display device 104.

According to the process steps shown in FIG. 8, in step S801, the client display device 104 receives data apportioned and sent from each of the servers over one or more data communication channels (e.g., data communication channels 111 or 112, 113 or 114, 115 of FIG. 1).

In step S802, the client display device 104 receives, if one of the plurality of servers determines that the data is image data associated with the pre-assigned partial region assigned to the server, information, instead of the image data. The information indicates an intended establishment of one or more new data communication channels over which to send the image data to the client display device.

In step S803, the client display device 104 sends an acknowledgment to each of the plurality of servers via a multicast communication channel. The acknowledgment confirms the intended establishment of the one or more new data communication channels.

In step S804, the client display device 104 establishes the one or more new data communication channels. In step S805, the client display device 104 receives the image data apportioned and sent by the one of the plurality of servers over the established one or more new data communication channels.

Because of the ability to process messages according to their importance as described above, the servers or associated endpoint, can request via a multicast channel or deem in the case of the client that the following messages are no longer relevant for processing.

By virtue of the foregoing arrangements, it is ordinarily possible to reduce the time it takes to provide image data to a client display device because both the resources at the server side and the resources at the client side are used more efficiently than compared to a single server to single client relationship. In addition, because multiple servers are used to provide the image data to the client display device, a more robust and reliable connection is provided between the servers and the client device than compared to a single server to single client relationship. Moreover, because multiple servers are used, scalability and clustering within a local area network environment can be easily accomplished.

Adjusting Regions of the Overall Image

Figure 9:
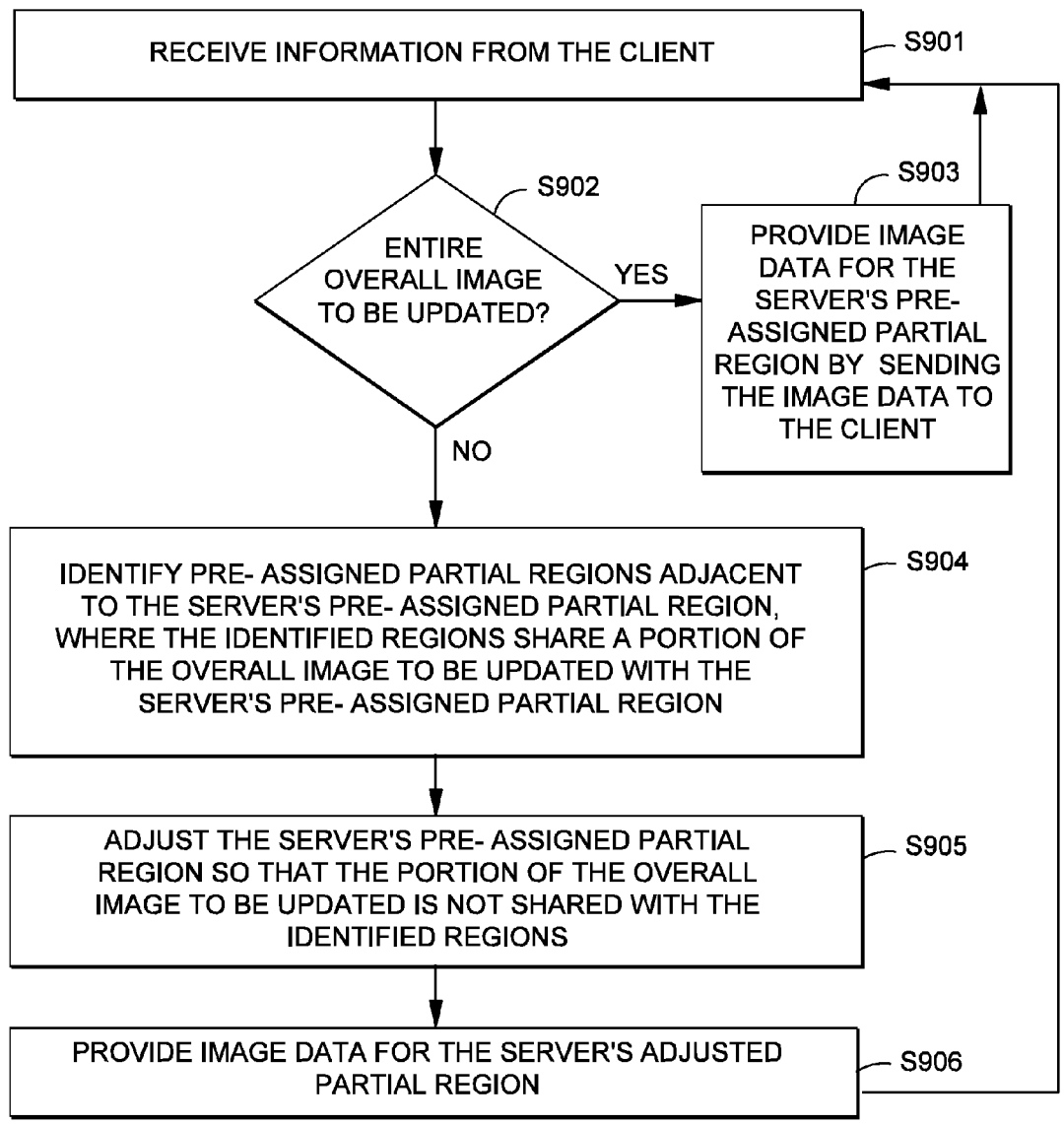
FIG. 9 is a flow chart for providing a detailed explanation of another example embodiment.

FIG. 9 is a flow chart for providing a detailed explanation of an additional example embodiment from the perspective of the servers (e.g., servers 101 to 103 of FIG. 1). The process steps shown in FIG. 9 are computer-executable process steps stored on a computer-readable memory medium such as at 230 on disk 220. The computer-executable process steps are executed by CPU 202, so as to implement providing image data to the client display device 104 which communicates with the plurality of servers 101 to 103, each of which provides a pre-assigned partial region of an overall image for display on the client display device 104.

According to the process steps shown in FIG. 9, in step S901, each server receives information from the client display device 104. The information indicates which portion of the overall image is to be updated.

In step S902, each server determines based on the information whether the entire overall image is to be updated. If it is determined that the entire overall image is to be updated, each server provides image data for the server's pre-assigned partial region by sending the image data over one or more respective data communication channels (e.g., data communication channels 111 or 112, 113 or 114, 115 of FIG. 1) to the client display device 104 (S903).

In step S904, if it is determined that a portion of the overall image, and not the entire overall image, is to be updated, each server identifies partial regions that include the portion to be updated that are adjacent to the server's pre-assigned partial region. In this case, the identified adjacent partial regions share the portion to be updated with the server's pre-assigned partial region. For example, looking at FIG. 4, if it is determined that the portion labeled 450 is to be updated but not the entire overall image, then the server responsible for partial region 401 would identify partial region 402 as an adjacent partial region that includes the portion to be updated.

In step S905, each server adjusts its pre-assigned partial region so that the portion to be updated is no longer shared by the adjacent pre-assigned partial regions (i.e., no longer lies on a boundary between the adjacent partial regions) identified in step S904. An example adjustment of the partial regions is described in detail below in connection with FIGS. 4 and 10. In step S906, each server provides image data for its adjusted partial region by sending the image data over one or more respective data communication channels to the client display device 104.

By virtue of the foregoing arrangements, it is ordinarily possible to reduce the time it takes to provide image data to a client display device because both the resources at the server side and the resources at the client side are used more efficiently than compared to a single server to single client relationship. In addition, because multiple servers are used to provide the image data to the client display device, a more robust and reliable connection is provided between the servers and the client device than compared to a single server to single client relationship. Moreover, because multiple servers are used, scalability and clustering within a local area network environment can be easily accomplished.

In some example embodiments, the server's pre-assigned partial region is adjusted to include the shared portion which is to be updated. In these embodiments, the server which provides image data corresponding to the partial region which was adjusted to include the shared portion to be updated, provides data faster than the other servers which provide image data to the client display device.

In other example embodiments, the server's pre-assigned partial region is adjusted to exclude the shared portion to be updated. In these example embodiments, the server which provides image data corresponding to the partial region which was adjusted to exclude the shared portion to be updated, provides data slower than the other servers which provide image data to the client display device.

When providing the image data, the server splits its adjusted partial region into sub-regions, and apportions and sends image data for the sub-regions over the one or more respective data communication channels. In addition, image data for each sub-region is sent over a selected one of the one or more data communication channels. The selection of the data communication channel is based on predetermined parameters such as a data capacity throughput of each of the data communication channels and/or a size of the image data.

In one example embodiment, the client display device 104 reassigns the pre-assigned partial regions of the overall image to the plurality of servers, based on a number of updates of the overall image and a location of the updates. The server then provides image data for its reassigned partial region. In one case, the pre-assigned partial regions are reassigned for the entire overall image. In another case, the pre-assigned partial regions are reassigned for a portion of the overall image.

In the process described above, the assigned partial regions are adjusted so as to be self contained, meaning that they are defined to provide information that is independent of another region. For example, a list on the display can be defined as two regions where the top half of the list is encoded by a single server, while the bottom half of the list is encoded by another server.

More specifically, the partial regions are adjusted so as to be independent or an atomic region, meaning a server encoding a region has no dependency on other servers or their regions. For example, a text list by itself that can be encoded by a single server would be an atomic region. However, if the same list is split such that the information of the list is split in the middle of an item within that list, then the partial region would be a dependent region. In other words, if the split list clearly separates the list such that there is no dependency of its content, then there would be two atomic regions.

Figure 10:
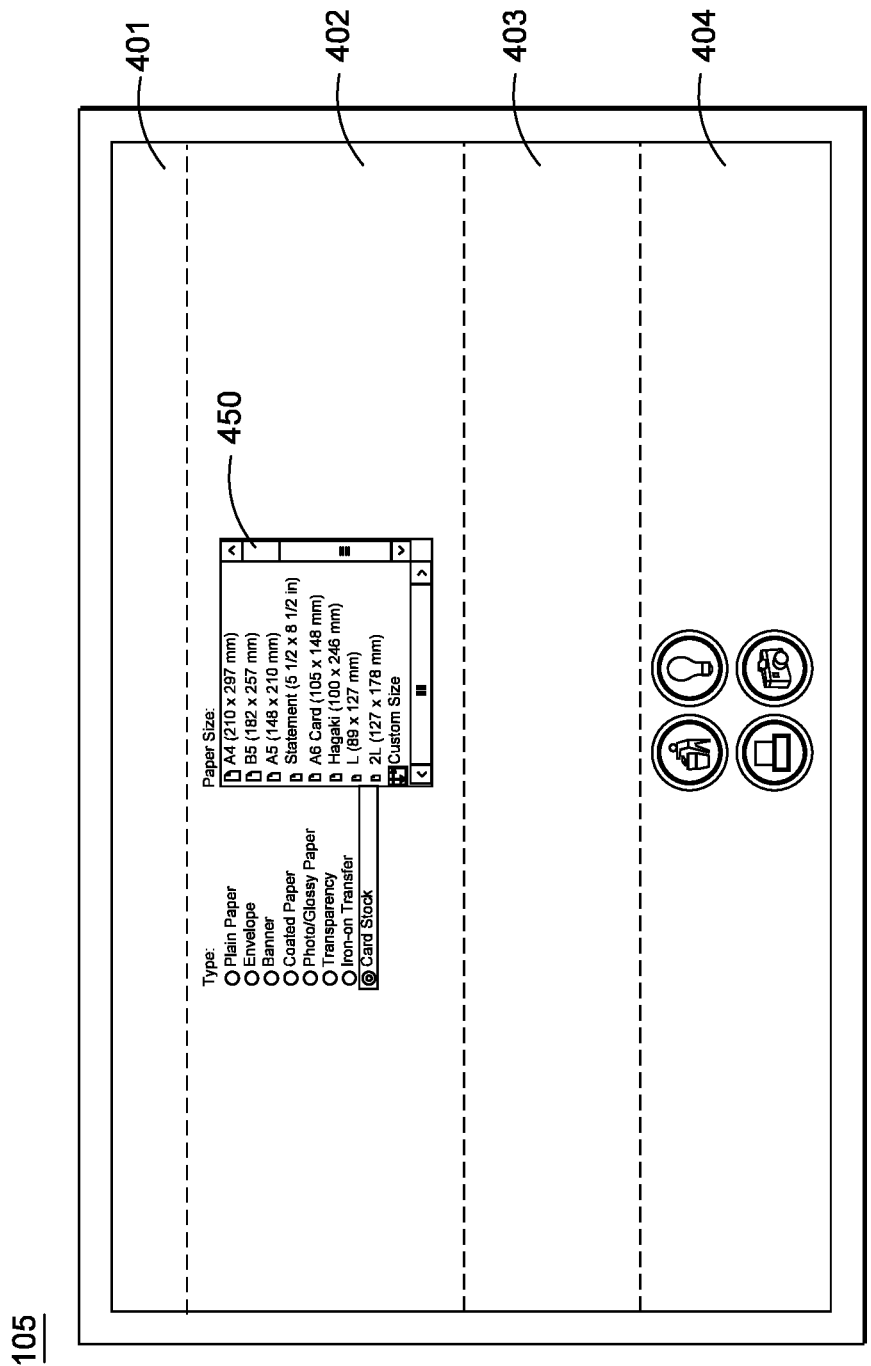
FIG. 10 is another detailed view of the display of the client shown in FIG. 1.

FIG. 10 is another detailed view of the display 105 of the client display device 104 shown in FIG. 1, for illustrating an example adjustment of the regions into atomic regions. Looking first at FIG. 4, it can be seen that the object 450 falls within both defined regions 401 and 402. Thus, in FIG. 4, region 401 is dependent on region 402 and vice versa. As shown in FIG. 10, the regions 401 and 402 have been adjusted so that the object 450 falls solely within region 402. Accordingly, in FIG. 10, region 401 is independent of region 402 and vice versa, thereby making both regions atomic.

In some example embodiments, in a situation where an overall image is a first image to be displayed (i.e., the image is the entire frame, much like an I-Frame), each server produces its region and encodes it in its entirety. The frame is then assigned an identification number. This can be seen as an ID composed of two parts: the first part is the image frame and the second part is the region it depicts. For example, ID 4-2 would indicate a 4th frame, region 2.

In a case where the server sends the region image on a single data communication channel, the server encodes the image data. In the case where the server has multiple physical interfaces, the server could construct a bondable virtual interface, apportion its region over a plurality of data communication channels and send it to the client. In this case, the splitting of the data is accomplished using, for example, header information, etc. Once the region data has been encoded, the data is sent to the client.

In a situation where the image is neither the first image nor a whole/key-frame (key frame here doesn't necessarily mean an MPEG I-Frame), each of the servers, knowing the region of its responsibility and the regions of all the other servers, can, in order of execution: (i) identify any adjacent regions having a shared portion which prevent it from becoming an atomic region; (ii) using the server's associated bondable virtual interface and its traffic monitor, reapportion the associated areas of the region allowing the quicker of the servers to take the shared portion, to allow the region to be atomic; (iii) analyze their region and modify the region into sub-regions which are atomic, and (iv) once the region has been encoded, send data to the client. In the above section (iii), each of the servers encodes its entire region. For example, ID 4-2 as in the above-described example, would become ID 4-2, 1 of 3, which translates to $4^{th}$ frame, $2^{nd}$ region, the first of three atomic sub-regions. In some example embodiments, when identifying sub-regions, the traffic monitor can be used to identify which specific physical interface, within a bondable virtual interface, should be used for each atomic region. This is done to efficiently send the regions to the client. This is accomplished, for example, by data size to performance ratio, a just-in-time mechanism, creation of a new bondable virtual interface or the like.

Other Embodiments

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), microdrive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a non-volatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular illustrative embodiments. It is understood that the scope of the appended claims is not limited to the above-described embodiments and that various changes and modifications may be made by those skilled in the relevant art without departing from the scope of the claims.

What is claimed is:

1. A method for providing display information to a client display device from a plurality of servers over one or more data communication channels, wherein each of the servers provides a pre-assigned partial region of an overall image for display on the client display device, and wherein in the method each of the plurality of servers performs:
    determining whether or not data to be sent is image data associated with the pre-assigned partial region assigned to the server;
    sending the data to be sent via an existent data communication channel to the client display device if it is determined that the data to be sent is not image data;
    sending, if it is determined that the data to be sent is image data, instead of the image data, information indicating an intended establishment of one or more new data communication channels over which to send the image data to the client display device;
    receiving an acknowledgment sent from the client display device via a multicast communication channel, wherein the acknowledgment confirms the intended establishment of the one or more new data communication channels;
    establishing the one or more new data communication channels; and
    apportioning and sending the image data over the established one or more new data communication channels to the client display device.

2. The method according to claim 1, wherein the one or more new data communication channels are included in an existing bondable virtual interface comprised in the client display device and/or the server.

3. The method according to claim 1, wherein the one or more new data communication channels are included in a new bondable virtual interface created in the client display device and/or the server.

4. The method according to claim 1, wherein if it is determined that data is subsequent image data, further comprising:
    sending information, rather than the subsequent image data, referencing the established one or more new data communication channels over which to send the subsequent image data to the client display device; and
    sending the subsequent image data over the one or more new data communication channels to the client display device.

5. The method according to claim 1, wherein the multicast communication channel is used to synchronize the sent data and image data.

6. The method according to claim 1, further comprising:
    determining whether the data is data having high priority; and
    sending, if it is determined that the data has high priority, the data having high priority over the established one or more new data communication channels to the client display device.

7. A non-transitory computer-readable medium on which is stored computer-executable process steps to be executed on a computer, the computer-executable process steps for providing display information to a client display device communicating from a plurality of servers, wherein each of the servers provides a pre-assigned partial region of an overall image for display on the client display device, the computer-executable process steps comprising process steps executable to perform a method according to claim 1.

8. A server comprising:
    a computer-readable memory constructed to store computer-executable process steps; and
    a processor constructed to execute the computer-executable process steps stored in the memory,
    wherein the process steps in the memory cause the server, which is one of a plurality of servers, to provide display information to a client display device communicating from the plurality of servers over one or more data communication channels, wherein each of the servers provides a pre-assigned partial region of an overall image for display on the client display device, and wherein the process steps stored in the memory include computer-executable steps to:
    determine whether or not data to be sent is image data associated with the pre-assigned partial region assigned to the server;
    send the data to be sent via an existent data communication channel to the client display device if it is determined that the data to be sent is not image data;
    send, if it is determined that the data to be sent is image data, instead of the image data, information indicating an intended establishment of one or more new data communication channels over which to send the image data to the client display device;
    receive an acknowledgment sent from the client display device via a multicast communication channel, wherein the acknowledgment confirms the intended establishment of the one or more new data communication channels;
    establish the one or more new data communication channels; and
    apportion and send the image data over the established one or more new data communication channels to the client display device.

9. A method for providing display information to a client display device from a plurality of servers over one or more data communication channels, wherein each of the servers generates a pre-assigned partial region of an overall image for display on the client display device, and wherein in the method each of the plurality of servers performs:

receiving information from the client display device, wherein the information indicates which portion of the overall image is to be updated;

determining based on the received information whether or not the entire overall image is to be updated;

providing, if it is determined that the entire overall image is to be updated, image data for the server's pre-assigned partial region by sending the image data over one or more respective data communication channels to the client display device; and identifying, if it is determined that a portion to be updated in the overall image is not the entire overall image, partial regions that include the portion to be updated that are adjacent to the server's pre-assigned partial region, wherein the portion to be updated lies on a boundary between the identified adjacent partial regions and the server's pre-assigned partial region, adjusting the server's pre-assigned partial region so that the portion to be updated no longer lies on a boundary with the identified adjacent pre-assigned partial regions, and providing image data for the server's adjusted partial region by sending the image data over one or more respective data communication channels to the client display device.

10. The method according to claim 9, wherein the server's pre-assigned partial region is adjusted to include the shared portion to be updated.

11. The method according to claim 10, wherein the server which provides image data corresponding to the partial region adjusted to include the shared portion provides data faster than the other servers providing image data to the client display device.

12. The method according to claim 9, wherein the server's pre-assigned partial region is adjusted to exclude the shared portion to be updated.

13. The method according to claim 12, wherein the server which provides image data corresponding to the partial region adjusted to exclude the shared portion provides data slower than the other servers providing image data to the client display device.

14. The method according to claim 9, wherein the server splits its adjusted partial region into sub-regions, and apportions and sends image data for the sub-regions over the one or more respective data communication channels.

15. The method according to claim 14, wherein image data for each sub-region is sent over a selected one of the one or more data communication channels, wherein the selection of the data communication channel is based on predetermined parameters.

16. The method according to claim 9, wherein the client display device reassigns the pre-assigned partial regions of the overall image to the plurality of servers, based on a number of updates of the overall image and a location of the updates, and wherein the server provides image data for its reassigned partial region.

17. The method according to claim 16, wherein the pre-assigned partial regions are reassigned for the entire overall image.

18. The method according to claim 16, wherein the pre-assigned partial regions are reassigned for a portion of the overall image.

19. A non-transitory computer-readable medium on which is stored computer-executable process steps to be executed on a computer, the computer-executable process steps for providing display information to a client display device from a plurality of servers, wherein each of the servers provides a pre-assigned partial region of an overall image for display on the client display device, the computer-executable process steps comprising process steps executable to perform a method according to claim 9.

20. A server comprising:
a computer-readable memory constructed to store computer-executable process steps; and
a processor constructed to execute the computer-executable process steps stored in the memory,
wherein the process steps in the memory cause the server, which is one of a plurality of servers, to provide display information to a client display device from the plurality of servers over one or more data communication channels, wherein each of the servers provides a pre-assigned partial region of an overall image for display on the client display device, and wherein the process steps stored in the memory include computer-executable steps to:
receive information from the client display device, wherein the information indicates which portion of the overall image is to be updated;
determine based on the received information whether or not the entire overall image is to be updated;
provide, if it is determined that the entire overall image is to be updated, image data for the server's pre-assigned partial region by sending the image data over one or more respective data communication channels to the client display device; and
identify, if it is determined that a portion to be updated in the overall image is not the entire overall image, partial regions that include the portion to be updated that are adjacent to the server's pre-assigned partial region, wherein the portion to be updated lies on a boundary between the identified adjacent partial regions and the server's pre-assigned partial region,
adjust the server's pre-assigned partial region so that the portion to be updated no longer lies on a boundary with the identified adjacent pre-assigned partial regions, and
provide image data for the server's adjusted partial region by sending the image data over one or more respective data communication channels to the client display device.

* * * * *